Figure 1:
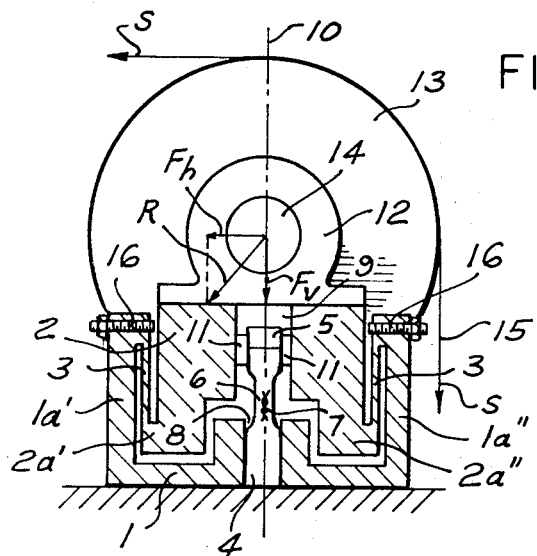

United States Patent [19]

Andersson

[11] 3,824,846

[45] July 23, 1974

[54] HOLDER FOR FORCE TRANSDUCER

[75] Inventor: John-Erik Andersson, Karlskoga, Sweden

[73] Assignee: Aktiebolaget Bofors, Bofors, Sweden

[22] Filed: Apr. 14, 1971

[21] Appl. No.: 133,888

[30] Foreign Application Priority Data
Apr. 14, 1970 Sweden.............................. 5094/70

[52] U.S. Cl..................................... 73/100, 73/144
[51] Int. Cl. ............................................ G01n 3/20
[58] Field of Search...... 73/143, 144, 141 A, 141 R, 73/141 AB, 100

[56] References Cited
UNITED STATES PATENTS

| | | | |
|---|---|---|---|
| 2,538,622 | 1/1951 | Johnson | 73/105 |
| 3,204,454 | 9/1965 | Friman et al. | 73/143 |
| 3,210,991 | 10/1965 | Weekley | 73/117.4 |
| 3,289,473 | 12/1966 | Louda | 73/143 |

FOREIGN PATENTS OR APPLICATIONS

| | | | |
|---|---|---|---|
| 477,356 | 10/1969 | Switzerland | 73/143 |
| 477,356 | 10/1969 | Switzerland | 73/143 |

Primary Examiner—Jerry W. Myracle
Attorney, Agent, or Firm—Hane, Baxley & Spicens

[57] ABSTRACT

There is disclosed a holder device for mounting a force-responsive transducer of the type sensing transverse or bending stresses. The holder device comprises a stationary member and a movable member for applying a force in a selected measuring direction to the movable member. Connecting members join the movable member to the stationary member and are positioned to act as a mild restraining force in the selected measuring direction. The stationary member and the movable member each include a recess for receiving therein an actuating part and a mounting part respectively of the transducer to be mounted on the holder device. The recesses are so located that a neutral axis of the transducer supported in the recesses is substantially parallel to lengthwise and transverse directions of the connecting members. The measuring direction is substantially normal to the neutral axis whereby a load applied to the movable member causes tensioning of each of the connecting members.

8 Claims, 4 Drawing Figures

HOLDER FOR FORCE TRANSDUCER

The present invention relates to a holder for a force transducer which senses bending or transversal forces of the type bending-stressed beam, and comprising a fixed member and a movable part, on which part a force or component thereof can be applied in a given measuring direction, the fixed member and the movable part being connected to each other via at least two connection parts which are parallel to each other and serve as weak springs in the measuring direction.

Force transducers are utilized in various applications when it is of interest to measure forces which when applied to the force transducer cause the same to transmit an electrical signal, the magnitude of which depends on the magnitude of the force in question. Depending upon the different conditions under which the force transducers are to be used, as well as variations in the functioning and construction of the transducers and variations in the magnitudes of the measured forces, it is desirable in many cases that it is possible to mount the force transducers in holders which have standardized external dimensions so that, for instance, a transducer can readily be changed. For certain types of transducers, the holder moreover protects the transducer from mechanical damage as well as influence of the environment.

It is knwon, for instance by Swedish patent 326,844 to fasten one end of a force transducer of the type in question in the fixed member and to actuate the other end of the transducer via the movable part, which is connected with the member via connection parts which are subjected to breaking stresses by a test load applied on the movable member. At least when it is a question of large loads, the connection parts must therefore have comparatively sturdy dimensions, which is highly undesirable as the bending of the transducer is comparatively great when measuring, and it is therefore necessary to have a large spring way for the connection parts in the measuring direction, without having too great force shunting and stresses.

The present invention solves said problems and provides for a holder for a transducer which permits large loads, while retaining the sensitivity of the transducer in the measuring direction. Due to its construction, the holder is moreover comparatively simple to manufacture, and functions reliably. If, for instance, a force transducer especially one having a cylindrical form is used, the transducer can be mounted on the member and the part in recesses consisting of cylindrical and concentric holes, extending partly or entirely through the member or the part, respectively. These holes can be made economically and with high accuracy by drilling operations performed at one time in the same machine.

The holder has such function and construction that a transducer in the holder can indicate both positive and negative forces in the measuring direction from an extremely stable zero position, for instance with respect to temperature. As the holder is moreover intended particularly for a force transducer for sensing bending or transversal forces of the type bending-stressed beam, it has in its applications a number of other advantages, and in order to illustrate these as well as the great importance of measuring accuracy and a stable zero position, examples will be given of a chosen field of application, viz. for the production of strip or wire-formed material, such as steel straps, wire, sheet metal, paper, plastic foil, electrical cable etc., where it is of great importance that it is possible to measure the tensile force in the material. The force transducers with their holders can be applied at the parts of interest in the machine in question, and the measuring signals obtained from the force transducers are then used e.g. for controlling the tension, for determining appropriate tension so that the best possible quality can be obtained for indication of slipping of the end of the strip in the roll gap, for adjustment of the rolls in the machine so that the path of the strip will be as correct as possible laterally etc.

A force transducer for measuring said tensions is normally subjected to wide temperature variations, corrosive fluids and mechanical stresses, and it can be of great interest to protect the actual force transducer, which requirement can be fully obtained by means of the present invention.

As regards the function of the force transducers in the field of application chosen, it is of extremely great importance that the holder permits that the zero point of the transducer can be kept very stable within a wide temperature range, inter alia in order that it is possible for the transducer to indicate when the end of the strip is released from a pair of rolls. Otherwise there is the risk that the control members in question will receive a signal from the transducer that indicates that there is a strip in a pair of rolls, even in cases when the end of the strip has been released, and in an automatically controlled process, this, in turn, would involve the risk that the controls will become over-modulated. If the temperature trend is negative and exceeds the signal for the minimum strip tension there will be the opposite danger, viz. that the transducer will give information to the controls that the end of the strip has been released from the pair of rolls, without this being the case. The corresponding situation can occur if the zero point or sensitivity of the transducer is changed due to mechanical overload. Another type of defect that can occur in the equipment mentioned here for measuring strip rolling tension if the zero point of the transducer is unstable is that the tension that has been set in the material is not obtained, which would cause a deterioration of the quality or a rupture of the strip.

Further, the holder is designed in such a way that it absorbs external forces and, accordingly, protects the force transducer from such forces and from movements. Moreover, in certain applications, it should be possible to provide it with built-in overload protection which prevents the transducer from being damaged by mechanical overload. For all of its applications, the holder is moreover designed to support the entire load or part of this load in such a way that the measuring range of the transducer need not be utilized for this purpose. Finally, the holder according to the invention should permit that the measuring force is conducted to the transducer in a well-defined and correct way.

The holder according to the invention fulfils all of these requirements and the feature that can be considered to be characteristic for this holder is that the member has first sections which extend part second sections located on the movable part and that the connection parts connect the ends of the first and the second sections, respectively. The fixed member has a first recess for a fastening part or actuation part located on the transducer. The movable part is provided with a second recess, into which an actuation part located on said force transducer extends. The first and second recesses have extensions such that a neutral axis in a transducer in the holder will be arranged substantially parallel in relation to the longitudinal and transversal directions of the connection parts, the measuring direction being substantially at right angles to said neutral axis positions of the fixed member and the movable part in relation to each other cause a load applied to the movable part to produce a tension in each of the connection parts.

Figure 2A:
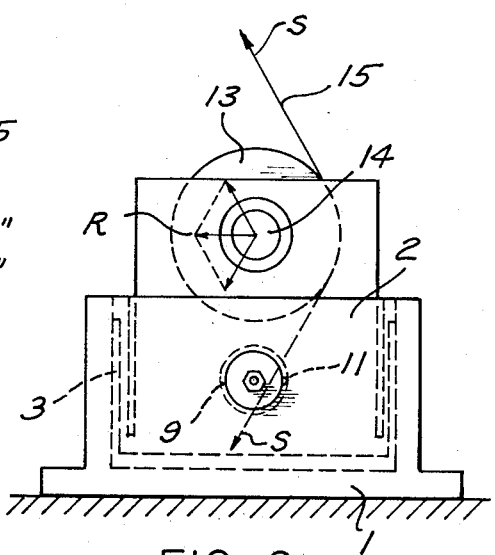
Figure 2B:
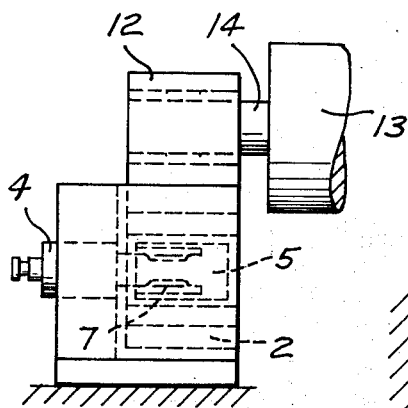
Figure 3:
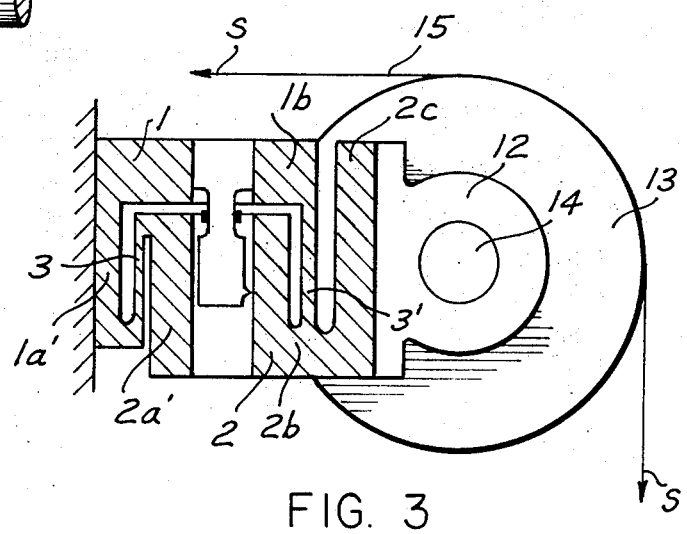

Embodiments which have the characteristics significant for the invention will be described in the following, with reference to the attached drawings, in which FIG. 1 in a vertical view and cross section shows a first embodiment;

FIG. 2a in a vertical view shows a second embodiment;

FIG. 2b shows another vertical view of the holder according to FIG. 2a;

FIG. 3 in a vertical view and in cross section shows a third embodiment of the holder.

In FIG. 1, the fixed member comprised in the holder is designated 1, and the movable part of the holder is designated 2. The fixed member and the movable part are connected to each other by two connection parts 3, which serve as weak springs in the measuring direction of the holder. The measuring direction of the holder coincides or is parallel with the direction of the force $F_h$. In the holder, a known bending-stressed bar is utilized which has a fastening part 4 and an actuation part 5. In the example of the embodiment, the fastening part is cylindrical as is the actuation part. Part 5 has recesses 6, into which resistive strain gauges 7 are fitted. The fixed member 1 is made with a first recess 8 for said fastening part 4, in the form of a through hole. In the same way, the movable part 2 has a second recess 9, into which the actuation part 5 of the transducer extends, the two recesses being concentrical and having such extensions that a neutral axis 10 in the force transducer will be substantially parallel with the connection parts 3 and that the measuring direction ($F_h$) will be substantially at right angles to the neutral axis 10. The member 1 also has first sections 1a' and 1b'' which extend past second sections 2a' and 2a'', respectively, located on the movable part. The connection parts 3 also connect the ends of the first and the second sections, respectively. In the example of the embodiment according to FIG. 1, the first sections of the fixed member 1 also extend outside the second sections on the movable part 2, and the movable part will thereby extend down into the fixed member. A load applied to the movable part will thereby cause a tension in the two connection parts 3, which can thus be dimensioned for tension and not as in the case of the previously known holders for compression, and the parts 3 can therefore be made with relatively small dimensions.

In the example of the embodiment according to FIG. 1, the first and second recesses 8 and 9 respectively also extend in such a way that the neutral axis 10 of the transducer is parallel with the longitudinal directions of the connection parts 3, which in FIG. 1 coincide with the plane of the figure. The holder can be made from one single block, in which slots are made in a known way in order to produce the fixed member and the movable part, which slots moreover can appropriately be made so that they form or permit the insertion of an overload protector.

The movable part 2 of the holder actuates the actuation part 5 of the transducer via a contact member 11 which is in contact with the surface of the second recess 9 either via a point or a surface, depending upon the type of transducer used. If the transducer senses bending stresses, the contact member should appropriately have a pointed part which is contact with the surface of the second recess 9. On the other hand, if the transducer senses the shearing stresses caused by the bending of the beam or bar, the contact member can also have the embodiment shown in FIG. 1, i.e. it can have a surface in contact with the surface of the second recess 9. If, in the latter case, the transducer is to indicate both positive and negative forces, it can moreover appropriately be made with two members arranged opposite each other.

In the embodiment according to FIG. 1 the fixed member 1 is attached to a foundation or the like, while a bearing bracket 12 mounts the movable part 2. A pulley or a roller 13, in turn, is suspended in the bearing bracket 12 by means of its axle 14. Guided over the pulley or roller is, for instance, a line 15, upon which a tension S acts. The tension causes a resulting force R in the bearing axle 14, the direction of which force depends upon the in and out directions of the line 15 on the pulley or the roller. The resulting force can be divided into a horizontal vector $F_h$, coinciding with the measuring direction, and a vertical vector $F_v$. As the connection parts 3 are weak in the measuring direction, or the horizontal direction, the main part of the horizontal vector $F_h$ will be taken up by the transducer and in the same way, while the connection parts are rigid in the vertical direction, the vertical vector $F_v$ will wholly be taken up by the connection parts. In this case the force to be measured is referred to as a horizontal force, but, of course, it is possible to apply other than horizontal forces on the holder if the holder is given a position which corresponds to such a force so that the measuring direction always is essentially perpendicular to the neutral axis of the transducer. In the embodiment according to the FIG. 1 an overload protector is also shown, which overload protector comprises screws 16 extending through the first sections 1a' and 1a'' of the fixed member and from the outside to the inside of the holder. By this extension of the screws the movable member cooperates with the screw ends so that the maximum move of the movable member is determined by means of the screws. The screws 16 are locked to the fixed member, in their adjusted positions by means of lock nuts.

In the holder according to FIGS. 2a and 2b the transducer is turned 90° in relation to the embodiment shown in FIG. 1, and the neutral axis of the transducer is thus parallel with the transversal directions of the connection parts 3. This positioning of the transducer makes it possible to build a low holder, which is of importance in certain applications. In FIG. 2a the in and out directions of the line 15 on the pulley or roller cause that the resulting force R in the bearing coinsides with the measuring direction. The embodiment also shows the above mentioned contact member 11 in the shape of a pointed part which lies close to the surface of the second recess 9. Moreover, FIG. 2b also shows the feature of the transducer in the cross-section, in which the transducer is provided with cut outs for obtaining a web or bridge which extends perpendicular to the plane of the figure, which web upholds strain gauges 7 on both of its sides.

In the holder described above, inter alia, the desired good temperature stability is obtained by the symmetrical construction as well as by the low force shunting from the connection parts (the membranes). Said low force shunting has become possible because of the fact that the membranes are in a tensioned condition and there is no risk that they will be broken off, and they can, accordingly, by made with comparatively small dimensions.

FIG. 3 shows a modification of the holder described above. The movable part 2 is placed beneath the fixed member 1, instead of vice versa. Instead of joining the ends of the first and second sections which extend past each other, as above, one of the connection parts 3' extends further, between parts directed opposite each other on the fixed member or the movable part, respectively. The part on the fixed member is designated 1b and the part on the movable part is 2b. The remaining first section 1a' in the fixed member is fastened to a fixed base, and the load on a fastening part 2c of the movable part outside one of the connection parts 3', counted form the fixed base.

Even if the modified embodiment is thus asymmetric, the dimensioning of the connection parts will be advantageous.

The invention is not limited to the embodiments shown above as examples, but can also be subjected to modifications within the scope of the following claims.

I claim:

1. A device for mounting a force-responsive transducer of the bending-stressed beam type for sensing transverse or bending stresses, said device comprising in combination:

a rigid stationary support member, a rigid movable member responding to a force in a selected measuring direction said movable member being disposed within said stationary member, a pair of yielding connecting members for joining the movable member to the stationary member, said connecting members being positioned to act as a restraining force in said selected measuring direction, said stationary member having first extensions and said movable member having second extensions, said extensions being disposed in substantially juxtaposed and spaced apart relationship, said connecting members joining the extensions of the stationary member to the extensions of the movable member, a force-responsive transducer having a bending-stressed beam including an actuating part and a mounting part, said stationary member and said movable member further each including a recess for receiving therein said force-responsive transducer, the locations and configurations of said recesses being such that a neutral axis of the transducer received in said recesses is substantially parallel to lengthwise and transverse directions respectively of said connecting members and that said measuring direction is substantially normal to said neutral axis whereby a load on the movable member causes tensioning of each of said connecting members.

2. The device according to claim 1 wherein each of said first extensions on the stationary member protrudes past the respective second extension on the movable member.

3. The device according to claim 1 wherein said recesses in the stationary member and the movable member each have a cylindrical configuration for receiving therein a correspondingly shaped actuating part and mounting part of a transducer.

4. A device for mounting a force-responsive transducer of the bending-stressed beam type for sensing transverse or bending stresses, said device comprising in combination:

a rigid stationary support member, a rigid movable member for responding to a force in a selected measuring direction, said movable member being disposed within said stationary member, a pair of yielding connecting members for joining the movable member to the stationary member, said connecting members being yieldable in the selected measuring direction but acting as restraining force in said direction, said stationary member having first extensions and said movable member having second extensions, said extensions being disposed in substantially juxtaposed and spaced apart relationship, said connecting members joining the extensions of the stationary member to the extensions of the movable member, a force-responsive transducer having a bending-stressed beam including an actuating part and a mounting part, said stationary member and said movable member further each including a recess for receiving therein said force-responsive transducer, a force transmitting member interposed between the movable member and the actuating part of the transducer, said force transmitting member coacting with an adjacent surface in said recess of the movable member in response to a deformation of said connecting members due to a response of the movable member to a load, thereby causing actuation of the actuating part of the transducer, the locations and configurations of said recesses being such that a neutral axis of the transducer received in said recesses is substantially parallel to lengthwise and transverse directions respectively of said connecting members and that said measuring direction is substantially normal to said neutral axis whereby a load on the movable member causes tensioning of each of said connecting members.

5. The device according to claim 4 wherein said fixed member, said movable member and said connecting members are a one-piece body including elongate slots extending parallel to and crosswise of the neutral axis of said body.

6. The device according to claim 4 and comprising an overload protection means, said means limiting movement of the movable member to a predetermined limit.

7. The device according to claim 4 wherein said overload protection means comprises screw means threaded through said first extension of the stationary member, the length of the screw means protruding from said extension on the side thereof facing the movable member limiting movement of said movable member relative to said extension of the stationary member.

8. The device according to claim 4 wherein said stationary member and said movable member are disposed in superimposition, the movable member being the lower member, one of said members having one upwardly directed extension and the other one downwardly directed extension, said two extensions being disposed in parrallel relationship and one of said connecting members joining said extensions, the other extensions of the stationary member being secured to a fixed base and a test load being supported by the other extension of the movable member laterally protruding from the side thereof joined to the stationary member by said one connecting member.

* * * * *